United States Patent [19]

Riedel

[11] 4,447,925
[45] May 15, 1984

[54] SLUICE APPARATUS FOR CLEANING THE INTERIOR OF PIPES

[75] Inventor: Erich O. Riedel, Haan, Fed. Rep. of Germany

[73] Assignee: Firma Alfred Gutmann GmbH and Co., Hamburg, Fed. Rep. of Germany

[21] Appl. No.: 364,196

[22] Filed: Mar. 31, 1982

[30] Foreign Application Priority Data

Apr. 1, 1981 [DE] Fed. Rep. of Germany ....... 3112968

[51] Int. Cl.³ .............................................. F28G 1/12
[52] U.S. Cl. ............................... 15/104.06 A; 165/95; 210/422
[58] Field of Search ............... 15/104.06 A, 104.06 R, 15/3.5, 3.51; 165/95; 210/420, 422

[56] References Cited

U.S. PATENT DOCUMENTS

| 2,801,824 | 8/1957 | Taprogge | 165/95 |
| 3,841,397 | 10/1974 | Elmer | 165/95 |
| 3,919,732 | 11/1975 | Honma | 15/3.51 |

*Primary Examiner*—Edward L. Roberts
*Attorney, Agent, or Firm*—Allison C. Collard; Thomas M. Galgano

[57] ABSTRACT

A sluice apparatus intended for dosed introduction of abrasive or rubbing elements into, and removal from, a liquid-carrying pipe or tube line system includes a drum-like collecting vessel with three connecting valves—namely, two continuous flow valves and one catcher valve. Disposed inside the vessel is an apertured catcher basket which is spaced from the inside wall of the vessel and which has the geometry of a partial drum with two side plates. Its upper end is secured by means of holding tubes adapted to be supported on holding pins so that the basket can be easily inserted and withdrawn.

4 Claims, 6 Drawing Figures

SLUICE APPARATUS FOR CLEANING THE INTERIOR OF PIPES

The present invention relates to a sluice apparatus for dosed introduction of abrasive or rubbing elements into, and removal from, a liquid carrying pipeline by means of a collecting vessel with continuous flow type connecting valves which is interposed into said pipeline.

Collecting vessels of the above type are known for so-called "pipe or tube line cleaning systems" using flexible sponge rubber bodies which, in accordance with their function, will be hereinafter referred to as "rubbing elements".

These rubbing elements are passed through the tubes or pipes with the flowing medium, normally water, to free the inside faces of such tubes or pipes from foreign particles sticking thereto which come from the liquid medium as such, but also from corrosion processes. In this way, these foreign particle depositions are removed due to a rubbing and/or scraping action and are carried out of the system with the medium. The separation of the rubbing elements from the medium is accomplished in special equipment units.

It has been previously known in the art to provide collecting vessels of the above defined type whose shape resembles that of a pot with connecting valves through which the rubbing elements can be introduced into, and discharged from, the respective tube or pipe system.

Disposed inside these vessels are so-called "catcher baskets" in stationary arrangement whose outlet opening can be closed by operating a so-called "catcher flap" or a ball cock. The medium stream flows through the perforated basket and the rubbing elements are retained therein.

It is an object of the present invention to provide a sluice apparatus in a particularly simple and also space saving manner which offers the further advantage that the rubbing elements thereby retained can be conveniently removed from the apparatus and recycled after examination.

According to the present invention, this problem is solved by providing a sluice apparatus for dosed introduction of rubbing elements into, and removal from, a liquid-carrying pipe or tube lines by means of a vessel interposed thereinto which is designed as a collecting tank, fitted with inlet and outlet valves and characterized by the fact that the drum-shaped collecting vessel is provided with a catcher valve which is spaced away from the continuous flow valves. Disposed inside this collecting vessel is a perforated catcher basket in spaced arrangement from the inside wall thereof.

According to one specific feature of the present invention, the catcher basket has the geometry of a partial drum with a free space provided coaxially between the flow valves, from the drum inside wall to the catcher basket outside face.

Another feature of the present invention provides for the catcher basket to be withdrawable from the sluice apparatus so that in this simple way it is possible to introduce dosed quantities of rubbing elements into the process cycle and remove said rubbing elements therefrom.

This is essential because in the course of their performance, these rubbing elements are size-reduced since the tube or pipe walls are pretty rough due to the foreign particle depositions thereon. As soon as this size reduction is such that the elements no longer contact the wall faces as they are being carried through the tubes or pipes, these undersize elements have to be removed from the process stream as a rule. Such a check has to be made almost every day and it is only in the rare cases when it is specifically desired that rubbing elements of smaller size than the inside diameter of the respective tube or pipe system be left in the process stream that such checks can be scheduled over longer periods, rather than daily intervals.

Other objects and features of the present invention will become apparent from the following detailed description considered in connection with the accompanying drawings, which disclose one embodiment of the invention. It is to be understood that the drawings are to be used for the purposes of illustration only, and not as a definition of the limits of the invention.

FIGS. 1 to 4 schematically reflect the geometry and functional performance of prior art sluice apparatus as earlier described herein. The drawback affecting the apparatus according to FIGS. 1 and 2 resides in that an adjustable catcher flap has to be provided and that it is not possible to remove the element-filled catcher basket from the apparatus for the purpose of checking the condition of the rubbing elements because conventional baskets are not adapted for such withdrawal.

Figure 1:
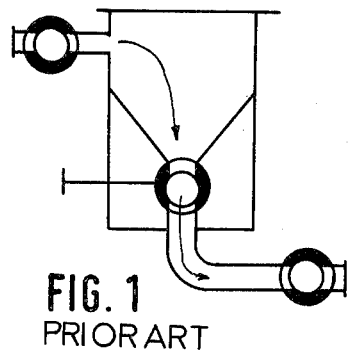
FIG. 1 shows a conventional sluice apparatus with inlet and outlet valves in a "continuous flow" state.
Figure 2:
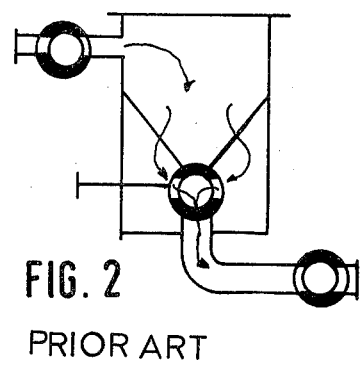
FIG. 2 represents a sluice apparatus according to FIG. 1, however in a "catching" state.
Figure 3:
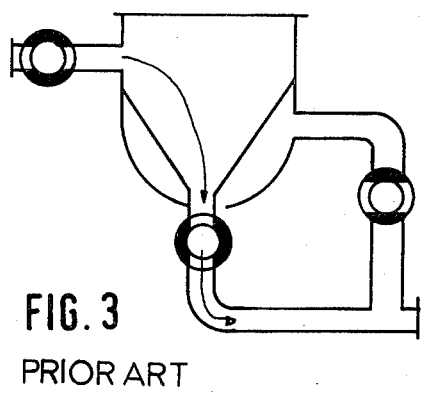
FIG. 3 shows a more advanced sluice apparatus with inlet and outlet valves in a "continuous flow" state.
Figure 4:
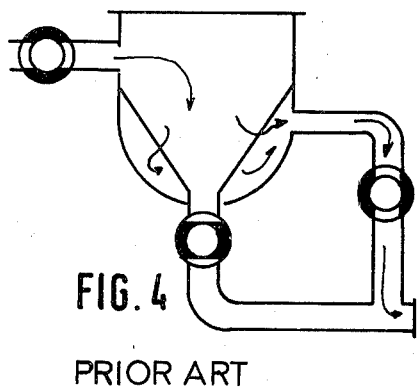
FIG. 4 represents a sluice apparatus of the type shown in FIG. 3, but in a "catching" state.

The apparatus according to FIGS. 3 and 4 is also not adapted to permit removal of the rubbing element filled catcher basket from the vessel for an element check. Another reason why this withdrawability is a factor to practical operation and/or performance resides in that, depending on the type of medium involved, a manual removal of the rubbing elements may not just be disagreeable and time-wasting, but even hazardous, for example, in such cases where the medium is hot or caustic and can cause injuries to the skin.

Figure 5:
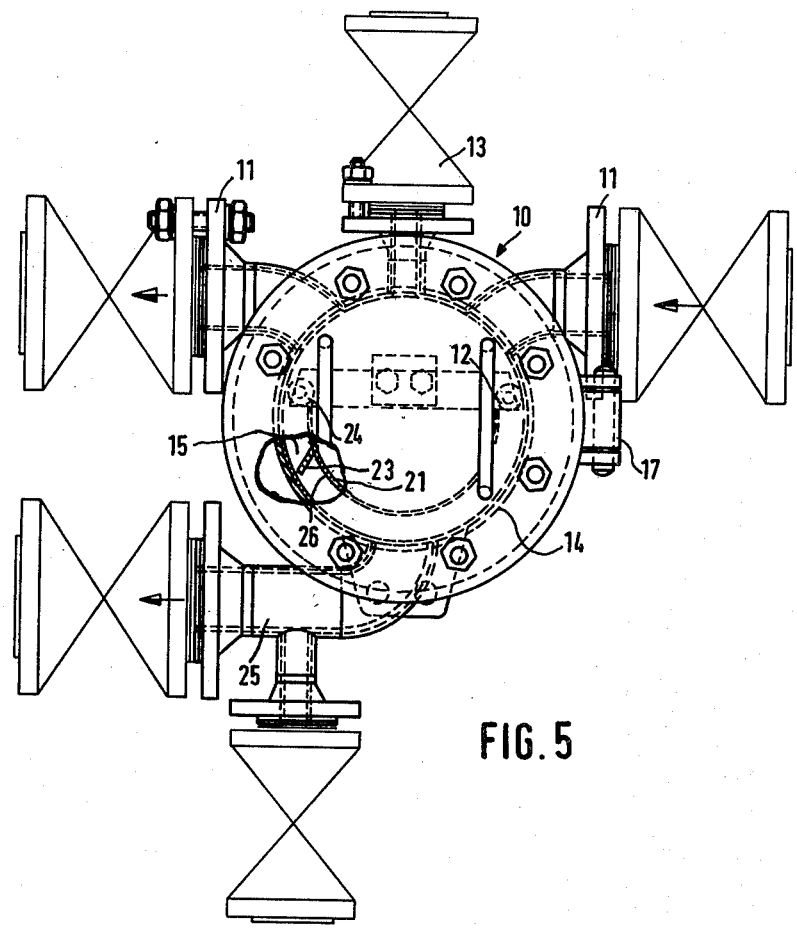
FIG. 5 is a front view of a sluice apparatus according to the present invention with a portion broken away to show the interior thereof.

FIG. 5 is a front view of an apparatus according to the present invention wherein the drum-like vessel 10 (sluice) carries the prior-known type of inlet and outlet valves 11 in its upper area. Medium flow is in arrow direction under normal operating conditions. The catcher valve 25 in the lower portion of the sluice 10 is closed so that the no medium flow identified by the arrow takes place in that area. The main component of the sluice 10 is a catcher basket 20 having a geometry of a partial drum which is arranged in spaced relation from the inside wall 14 of vessel 10. The catcher basket 20 is so designed in its upper part that it can be suspended from, or retained on, holding pins 12. The upper marginal zone of the catcher basket can also have the form of a handle or closed loop.

While in an operating state, the continuous flow valves 11 on both sides are open. When rubbing elements are to be collected, exit valve 11 will be closed and catcher valve 25 will be opened so that the medium will be allowed to flow through the apertures 21 of basket 20, whereby the elements will be retained and collected in the trough-shaped section of catcher basket 20.

Figure 6:
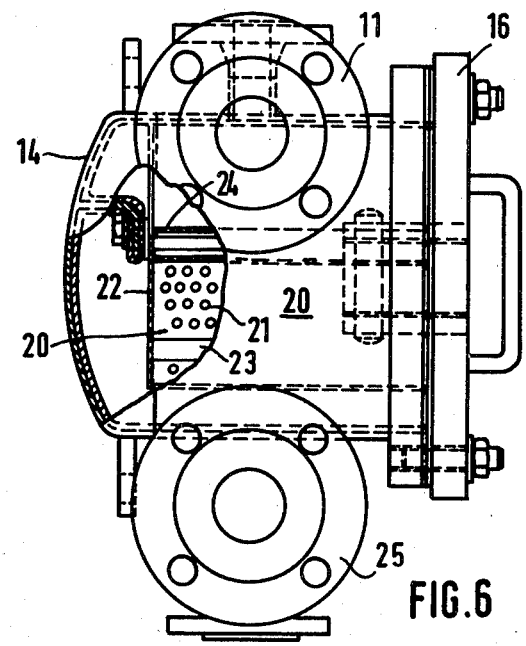
FIG. 6 is a side elevation of a sluice apparatus according to the present invention with a portion broken away to show the interior thereof.

It has been discovered during operation of the sluice that the flow limiting baffles 23 in FIG. 6 are not needed where greater water volumes are involved. However, when the water flow rate is low, there is a lack of turbulence at catcher basket 20 and the rubbing elements disposed therein are not stirred up sufficiently to be discharged through outlet valve 11 along with the exiting water stream. Thus, flow limiting baffles 23 are necessary to cause such turbulence at low flow rates so as to insure discharge of the rubbing elements from the apparatus.

The basket as such is fitted with side plates 22 on both ends. When collection of rubbing elements in the basket is completed, both inlet and outlet valves 11 will be closed and medium left in the drum will be removed from the sluice via catcher valve 25.

In this case, it is deemed advisable to open the vent valve 13 disposed in the upper part of sluice 10 to create a pressureless condition inside sluice 10 for the latter to completely run empty. Now the cover 16 fitted on a hinge 17 can be swung open and the catcher basket with rubbing elements can be removed from the sluice for an element check.

This procedure will be reversed to reintroduce the catcher basket 20. The continuous flow valves and the catcher valve 25 are closed. The catcher basket filled with rubbing elements will be inserted into the sluice 10 and the cover 16 will be closed.

One of the flow valves will then be opened with vent valve 13 remaining in open condition.

Water enters the sluice 10 on opening the feed valve 11 which admits flow into the sluice. When the sluice is full, the vent valve will be reclosed and the other flow valve 11 opened. Normal operation then commences.

By regulating the valves 11, it is possible to introduce the rubbing elements into the circuit at intervals, i.e., under dosing conditions, which is essential for operation.

While only one embodiment of the present invention has been shown and described, it is obvious that many changes and modifications may be made thereunto without departing from the spirit and scope of the invention.

I claim:

1. A sluice apparatus for dosed introduction of rubbing elements into, and removal from, a liquid-carrying pipeline, comprising:
    a drum-shaped collecting vessel interposable into the pipeline having a flow inlet valve and a flow outlet valve in the upper portion thereof for establishing a continuous flow therethrough, said drum-shaped collecting vessel also having a catcher valve in the lower portion thereof; and
    a catcher basket with side plates having a multiplicity of apertures formed therein arranged inside said vessel above said catcher valve in spaced relation from the inside wall of said vessel so that said rubbing elements enter said catcher basket from said flow inlet valve.

2. The sluice apparatus of claim 1, wherein said catcher basket has the shape of a partial drum which defines a free space provided coaxially between said flow inlet and outlet valves, from said vessel inside wall to the catcher basket outside wall.

3. The sluice apparatus of claim 1, wherein said collecting vessel has at least one removable cover and wherein said catcher basket is removably mounted therein to permit withdrawal thereof after removal of said cover.

4. The sluice apparatus of claim 1, wherein said catcher basket comprises a trough-shaped base and wherein said catcher basket has lateral upper ends secured to holding pins.

* * * * *